Patented June 29, 1937

2,085,037

UNITED STATES PATENT OFFICE 2,085,037

AZO COMPOUNDS AND THEIR PRODUCTION

Fritz Mietzsch, Wuppertal-Barmen, and Josef Klarer, Wuppertal-Elberfeld, Germany, assignors to Winthrop Chemical Company, Inc., New York, N. Y., a corporation of New York No Drawing. Application December 14, 1933, Serial No. 702,427. In Germany December 24, 1932

15 Claims. (Cl. 260—96)

This invention relates to azo compounds which display a bactericidal action, and to a process of preparing the same.

In accordance with the present invention azo compounds displaying a bactericidal action are obtainable by the manufacture of compounds of the general formula:

$$R_1-N=N-R_2,$$

wherein $R_1$ stands for a para-sulfamide or disulfamide substituted radical of the benzene series, and $R_2$ stands for a cyclic radical containing nitrogen in basic linkage, that is for an aminobenzene or aminonaphthalene radical, which contains at least one further basic nitrogen atom in the form of an amino or alkylamino group. In the new azo compounds the amino group of the sulfamide group may be a primary, secondary or tertiary amino group. It may, for instance, be substituted by saturated or unsaturated alkyl or cycloalkyl groups, such as methyl, ethyl, allyl, butyl, isoamyl, cyclohexenyl or by aralkyl groups, such as benzyl and phenylethyl. The two hydrogen atoms of the amino group may also be replaced by an alkylene group in which case the nitrogen atom of the sulfamide group forms a hydrogenated heterocyclic ring system with the alkylene group, for instance, a pyrrolidyl or piperidyl ring. The new compounds may contain besides the above specified characteristic groups other substituents, such as alkyl, halogen, hydroxyl, alkoxy, phenoxy and the nitro group, but free acid groups should not be present. The amino groups attached to the one nucleus of the azo compounds may be substituted, for instance, by alkyl groups.

In accordance with the present invention the azo compounds of the kind specified are obtainable by reacting upon an aminobenzene or aminonaphthalene compound which contains at least one further nitrogen atom in the form of an amino or alkylamino group with a parasulfamide or a disulfamide diazo compound of the benzene series, whereby the reacting components may be further substituted in the manner above indicated. The reaction is advantageously carried out in the presence of water at a low temperature, say at about 20° C. or below. The azo compounds thus obtainable are colored powders which are insoluble in water but form, if they contain amino groups, with mineral acids, such as hydrochloric, hydrobromic and sulfuric acid, salts which dissolve more or less in water. The azo compounds which contain a hydrogen atom at the amino group of the sulfamide group may also be dissolved in caustic alkalies. In view of their remarkable bactericidal action the new compounds have proved active in the treatment of infectious diseases.

The invention is further illustrated by the following examples without being restricted thereto:

Example 1.—20.8 grams of the hydrochloride of 4-amino-benzene-sulfonoamide are dissolved in 100 ccs. of water and diazotized with a solution of 6.9 grams of sodium nitrite in water after 15 ccs. of concentrated hydrochloric acid have been added. To this diazo solution a solution of 10.8 grams of 1,3-phenylene diamine and 50 grams of crystallized sodium acetate in 400 ccs. of water are added. After the coupling reaction has been finished, the solution is rendered weakly alkaline, the base is sucked off and washed with water. It is then dissolved in acetone. After the addition of hydrochloric acid the hydrochloride of the 4'-sulfonoamido-2,4-diaminoazobenzene is obtained in the form of red prisms, melting at 249° C. with a dark coloration and decomposition. It is soluble in water with an orange color. By means of excess hydrochloric acid the hydrochloride is salted out. The free base is precipitated by means of sodium carbonate or dilute ammonia. The compound is readily soluble in caustic alkalies with yellowish red coloration.

22.2 grams of the hydrochloride of 4-amino-benzene-sulfonomethylamide are diazotized in the above described manner and coupled with 10.8 grams of 1,3-phenylene diamine. The base which is precipitated by means of ammonia is dissolved in methyl alcohol with the addition of hydrochloric acid while hot. After a short time the hydrochloride of the 4'-sulfonomethylamide-2,4-diaminoazobenzene crystallizes in the form of prisms melting at 181° C., the prisms being rounded at their longitudinal ends and appearing steel-blue in on-falling light and red in through-falling light. They are soluble in water and caustic alkalies. The free base is precipitated from the aqueous solution by means of dilute ammonia.

In an analogous manner when starting with the 4-aminobenzene sulfonoethylamide the hydrochloride of the 4'-sulfono-ethylamide-2,4-diaminoazobenzene is obtained in the form of light red prisms melting at 160° C.

21.6 grams of 4-aminobenzene sulfonohydroxyethylamide are diazotized in accordance with the directions given above and coupled with 1,3-phenylenediamine. The hydrochloride precipitates on the addition of ethereal hydrogen chloride to the methyl alcoholic solution of the free base in the form of red glittering prisms melting at 194° C. It is more readily soluble in water than the unsubstituted sulfamide compound described above.

20 grams of 4-aminobenzenesulfono dimethylamide are diazotized in the manner described above and coupled with 10.8 grams of 1,3-phenylenediamine. By dissolving the free base in methyl alcohol with the addition of hydrochloric acid while heating, the hydrochloride is obtained on cooling in the form of blue glittering red-brown prisms melting at 234° C. This compound, contrary to the compounds described above, is insoluble in caustic alkalies.

In a similar manner by diazotizing and coupling the 4-aminobenzenesulfono diethylamide the 4'-sulfono-diethylamide-2,4-diaminoazobenzene hydrochloride is obtained in the form of brick red needles melting at 221° C. with decomposition. The aqueous solution has an orange color. Also this compound is insoluble in alkalies.

In an analogous manner there are obtained the 4'-sulfonocyclohexylamide-2,4 - diaminoazobenzene-hydrochloride in the form of orange colored crystals melting at 234° C.; the 4'-sulfonobenzylamide-2,4 - diaminoazobenzene-hydrochloride in the form of red crystals, melting at 228° C.; the 4'-sulfonopiperidide-2,4-diaminoazobenzene-hydrochloride in the form of light red crystals melting at 241° C.; the 4'-sulfonoamide-2-amino-4-diethylaminoazobenzene-hydrochloride in the form of brown red crystals, melting at 198° C.; the 4'-sulfonoamide-2,4-tetraethyldiaminoazobenzene-hydrochloride in the form of red crystals melting at 235° C.; the 3'-methyl-4' - sulfonoamide - 2,4 - diaminoazobenzene - hydrochloride in the form of red crystals melting at 238° C.; the 4'-sulfonoamide-2,4-diamino-5-hydroxyazobenzene-hydrochloride in the form of brown prisms melting at above 300° C.; the free base melts at 113° C.; the 4'-sulfonoamide-benzeneazo - 4,5 - diaminonaphthalene - hydrochloride in the form of black brown crystals melting at above 300° C., being readily soluble in caustic soda lye with a red coloration.

*Example 2.*—25.1 grams of aminobenzene-3,5-disulfonoamide are diazotized in the usual manner and coupled with 10.8 grams of 1,3-phenylenediamine. The base is dissolved in methyl alcohol and converted into the hydrochloride of 3',5'-disulfonoamide-2,4 - diaminoazobenzene by means of hydrochloric acid. The hydrochloride crystallizes in the form of light red prisms melting at 277° C. with decomposition. It is sparingly soluble in water and readily soluble in caustic alkalies with an orange coloration.

In an analogous manner the hydrochloride of 2',4'-disulfonoamide-2,4-diaminoazobenzene is obtained when starting with aminobenzene-2,4-disulfonoamide in the form of red brown crystals melting above 250° C.

While we have described our improvements in great detail and with respect to preferred embodiments thereof, we do not desire to limit ourselves to such details or embodiments.

Particularly we wish to point out that in the annexed claims the terms "diamino-benzenes" and "diamino-naphthalenes" are intended to include also such radicals of the kind specified which contain besides the amino groups, specifically mentioned as substituents, also other usual substituents, for instance, alkyl and alkoxy groups and halogen atoms. However, as stated above, free acid substituents should not be present.

We claim:—
1. Azo compounds of the general formula:

$$R_1-N=N-R_2,$$

wherein $R_1$ stands for a cyclic radical selected from the group consisting of para-sulfamide and disulfamide substituted radicals of the benzene series and of the corresponding N-alkyl, N-(4 to 5 membered)-alkylene, N-mononuclear-arylalkyl and N-mononuclear cycloalkyl substituted radicals, and $R_2$ stands for a cyclic radical containing nitrogen in basic linkage, which cyclic radical is selected from the group consisting of diaminobenzenes, diaminonaphthalenes and the corresponding N-alkylated radicals, which azo compounds form water-soluble salts with mineral acids.

2. Azo compounds of the general formula:

$$R_3-N=N-R_2,$$

wherein $R_2$ stands for a cyclic radical containing nitrogen in basic linkage, which cyclic radical is selected from the group consisting of diaminobenzenes, diaminonaphthalenes and the corresponding N-alkylated compounds, and $R_3$ stands for a parasulfonamide-benzene radical, which azo compounds form water-soluble salts with mineral acids.

3. Azo compounds of the general formula:

$$R_1-N=N-R_4,$$

wherein $R_1$ stands for a cyclic radical selected from the group consisting of para-sulfamide and disulfamide substituted radicals of the benzene series and of the corresponding N-alkyl, N-(4 to 5 membered)-alkylene, N-mononuclear-arylalkyl and N-mononuclear cycloalkyl substituted radicals, and $R_4$ stands for a diaminobenzene radical, which azo compounds form water-soluble salts with mineral acids.

4. Azo compounds of the general formula:

$$R_3-N=N-R_4,$$

wherein $R_3$ stands for a para-sulfamide-benzene radical and $R_4$ stands for a diaminobenzene radical, which azo compounds form water-soluble salts with mineral acids.

5. Azo compounds of the formula:

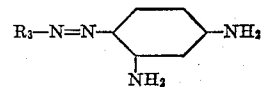

wherein $R_3$ stands for a para-sulfamide-benzene radical, which azo compounds form water-soluble salts with mineral acids.

6. The azo compound of the formula:

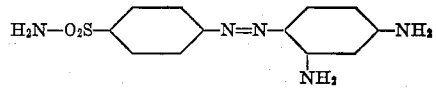

which is soluble in mineral acids and caustic alkalies and forms in the form of its hydrochloride red prisms melting at 249° C.

7. The azo compound of the formula:

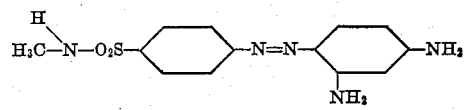

which is soluble in mineral acids and caustic alkalies and forms in the form of its hydrochloride prisms melting at 181° C.

8. The azo compound of the formula:

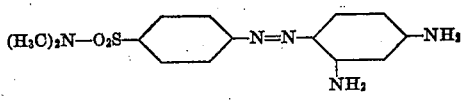

which is soluble in mineral acids and forms in the form of its hydrochloride prisms melting at 234° C.

9. The process which comprises coupling a cyclic compound containing nitrogen in basic linkage selected from the group consisting of diaminobenzenes and diaminonaphthalenes and the corresponding N-alkylated compounds with a cyclic diazo compound selected from the group consisting of para-sulfamide and disulfamide diazo compounds of the benezene series and of the corresponding N-alkyl, N-(4 to 5 membered)-alkylene, N-mononuclear-arylalkyl and N-mononuclear cycloalkyl substituted compounds.

10. The process which comprises coupling a cyclic compound containing nitrogen in basic linkage selected from the group consisting of diaminobenzenes and diaminonaphthalenes and the corresponding N-alkylated compounds with a para-sulfonamide benzene diazo compound.

11. The process which comprises coupling a diaminobenzene with a cyclic diazo compound selected from the group consisting of para-sulfamide and disulfamide diazo compounds of the benzene series and of the corresponding N-alkyl, N-(4 to 5 membered)-alkylene, N-mononuclear-arylalkyl and N-mononuclear cycloalkyl substituted compounds.

12. The process which comprises coupling a diaminobenzene with a para-sulfonamide benzene diazo compound.

13. The process which comprises coupling phenylenediamine with para-sulfonamide-diazobenzene.

14. Azo compounds of the general formula:

wherein $R_2$ stands for a cyclic radical containing nitrogen in basic linkage, which cyclic radical is selected from the group consisting of diaminobenzenes, diaminonaphthalenes and the corresponding N-alkylated compounds, which azo compounds form water-soluble salts with mineral acids.

15. Azo compounds of the general formula:

wherein $R_4$ stands for a diaminobenzene radical, which azo compounds form water-soluble salts with mineral acids.

FRITZ MIETZSCH.
JOSEF KLARER.